United States Patent [19]

Patel et al.

[11] Patent Number: 4,529,942
[45] Date of Patent: Jul. 16, 1985

[54] FREE-ELECTRON AMPLIFIER DEVICE WITH ELECTROMAGNETIC RADIATION DELAY ELEMENT

[75] Inventors: Chandra K. N. Patel, Summit; Earl D. Shaw, Harding Township, Morris County, both of N.J.

[73] Assignee: AT&T Bell Laboratories, Murray Hill, N.J.

[21] Appl. No.: 343,841

[22] Filed: Jan. 29, 1982

[51] Int. Cl.$^3$ .............................................. H01S 3/09
[52] U.S. Cl. ........................................ 330/4.3; 372/2
[58] Field of Search ................... 372/2, 4, 19, 23; 330/4.3

[56] References Cited

U.S. PATENT DOCUMENTS 3,822,410  7/1974  Madey .................................. 331/94.5
4,425,649  1/1984  Elias et al. ............................... 372/2

OTHER PUBLICATIONS

Shaw et al., "Use of Intercavity Filters . . . Free-Electron Lasers", 2/2/81, pp. 332-335, Phys. Rev. Lett., vol. 46, #5.
Segall, "Laser and Electro-Optic", vol. 10, #3, 1978.
Pridmore et al., "Low Gamma . . . Free Electron Laser", 1980, pp. 79–84, S.P.I.E., vol. 247.
Shaw et al., "Applications in Solid . . . FEL", 12/1980, pp. 53–60, S&S Press, Laser Conf., New Orleans.
H. Motz, Applications of the Radiation from Fast Electron Beams, Journal of Applied Physics, vol. 22, (1951), 527–535.
H. Motz et al., Experiments on Radiation by Fast Electron Beams, Journal of Applied Physics, vol. 24, (1953), 826–833.
L. R. Elias, Observation of Stimulated Emission of Radiation . . . , Physical Review Letters, vol. 36, (1976), 717–720.
D. A. G. Deacon et al., First Operation of a Free-Electron Laser, Physical Review Letters, vol. 38, (1977), 892–894.
R. Ulrich, Far-Infrared Properties of Metallic Mesh . . . , Infrared Physics, vol. 7, (1967), 37–55.
R. Ulrich, Interference Filters for the Far Infrared, Applied Optics, vol. 7, (1968), 1987–1996.
R. Ulrich et al., Variable Metal Mesh Coupler . . . , Applied Optics, vol. 9, (1970), 2511–2516.
C. O. Weiss, Optically Pumped FIR-Laser . . . , Applied Physics, vol. 13, (1977), 383–385.
E. D. Shaw et al., Theoretical Considerations for FEL's . . . , Free-Electron Generators of Coherent Radiation, Addison-Wesley, 1980, 665–669.

Primary Examiner—Nelson Moskowitz
Attorney, Agent, or Firm—Peter A. Businger

[57] ABSTRACT

In the interest of increased efficiency and gain of free-electron amplifier devices, means are provided for retarding electromagnetic radiation in such devices. This permits an electron beam pulse to catch up with a pulse of electromagnetic radiation and thus to interact repeatedly with electromagnetic radiation. Retarding means may be implemented, e.g., as one or several waveguides having suitable diameter and length; alternatively, resonant filters consisting essentially of wire meshes can be used.

7 Claims, 6 Drawing Figures

FREE-ELECTRON AMPLIFIER DEVICE WITH ELECTROMAGNETIC RADIATION DELAY ELEMENT

FIELD OF THE INVENTION

The invention is concerned with devices in which electromagnetic radiation is amplified upon interaction with a beam of electrons.

BACKGROUND OF THE INVENTION

Free-electron amplifier operation has been proposed based on the emission of electromagnetic radiation by accelerated high-energy electrons, acceleration typically being in a spatially periodic magnetic field whose direction is essentially transverse to electron velocity. A theoretical study of the emission of electromagnetic radiation by periodically accelerated electrons was made by H. Motz, "Applications of the Radiation from Fast Electron Beams", *Journal of Applied Physics*, Vol. 22 (1951), pp. 527–535, and experimental results were presented by H. Motz et al., "Experiments on Radiation by Fast Electron Beams", *Journal of Applied Physics*, Vol. 24 (1953), pp. 826–833.

More recently, amplification of infrared radiation by relativistic free electrons in a spatially periodic magnetic field was observed by L. R. Elias et al., "Observation of Stimulated Emission of Radiation by Relativistic Electrons in a Spatially Periodic Transverse Magnetic Field", *Physical Review Letters*, Vol. 36 (1976), pp. 717–720, and free-electron laser operation at a wavelength of 3.4 micrometers was reported by D. A. G. Deacon et al., "First Operation of a Free-Electron Laser", *Physical Review Letters*, Vol. 38 (1977), pp. 892–894. As shown, e.g., in U.S. Pat. No. 3,822,410, issued July 2, 1974 to J. M. J. Madey, free-electron laser apparatus typically includes components such as, in particular, a source of high-energy electrons, a source of a spatially periodic magnetic field, and two radiation reflecting elements of which one is essentially totally reflecting and the other is semitransparent to generated radiation.

Free-electron lasers are understood to be most promising for generating tunable far-infrared radiation. Accordingly, the following are considered relevant: R. Ulrich, "Far-Infrared Properties of Metallic Mesh and its Complementary Structure", *Infrared Physics*, Vol. 7, pp. 37–55 (1967), R. Ulrich, "Interference Filters for the Far Infrared", *Applied Optics*, Vol. 7, pp. 1987–1996 (1968), R. Ulrich et al., "Variable Metal Mesh Coupler for Far Infrared Lasers", *Applied Optics*, Vol. 9, pp. 2511–2516 (1970), C. O. Weiss, "Optically Pumped FIR-Laser with Variable Fabry-Perot Output Coupler", *Applied Physics*, Vol. 13, pp. 383–385 (1977), and E. D. Shaw et al., "Theoretical Considerations for FEL's in the Far Infrared", *Free-Electron Generators of Coherent Radiation*, Addison-Wesley, 1980, pp. 665–669.

A key feature of free-electron amplifier operation is amplification of electromagnetic radiation due to recoil of electrons during emission of electromagnetic radiation and attendant separation of the frequencies of emission and absorption. Amplification occurs at frequencies for which the transition rate for emission exceeds the transition rate for absorption, and the amplification factor is directly dependent on the duration of interaction between electromagnetic radiation and electrons. If a pulsed electron beam is used and if the speed of electrons is appreciably less than the speed of light, it may be that such duration of interaction is undesirably brief.

SUMMARY OF THE INVENTION

It is an object of the invention to lengthen the time of interaction between electromagnetic radiation and electrons in free-electron amplifier devices. Such object is realized by means of a delay element for retarding the propagation of electromagnetic radiation to permit repeated interaction between an electron beam pulse and an electromagnetic radiation pulse. The delay element is designed to affect electromagnetic radiation by causing a phase shift and a time delay, and designed further to leave the electron beam essentially unaffected.

Current technology permits free-electron amplifier operation at wavelengths up to approximately 10 millimeters, and the invention is of particular interest when electromagnetic radiation has a wavelength in the range of from 20 micrometers to 1 millimeter.

DETAILED DESCRIPTION

A free-electron amplifier device is designed for amplifying electromagnetic radiation which may be as spontaneously emitted or as injected from an external source. Such a device is typically operated in a pulsed fashion in which electron beam pulses may be out-distanced by an amplified electromagnetic wave front within a fraction of an available periodic magnet length. In order to allow electrons to catch up with electromagnetic radiation, one or several electromagnetic radiation delay elements are provided.

A device in accordance with the invention may be a laser comprising two reflectors for reflecting electromagnetic radiation. Alternatively, there may be a single reflector in a hybrid laser-amplifier device in which a delay element in accordance with the invention additionally serves as a partial reflector.

Figure 1:
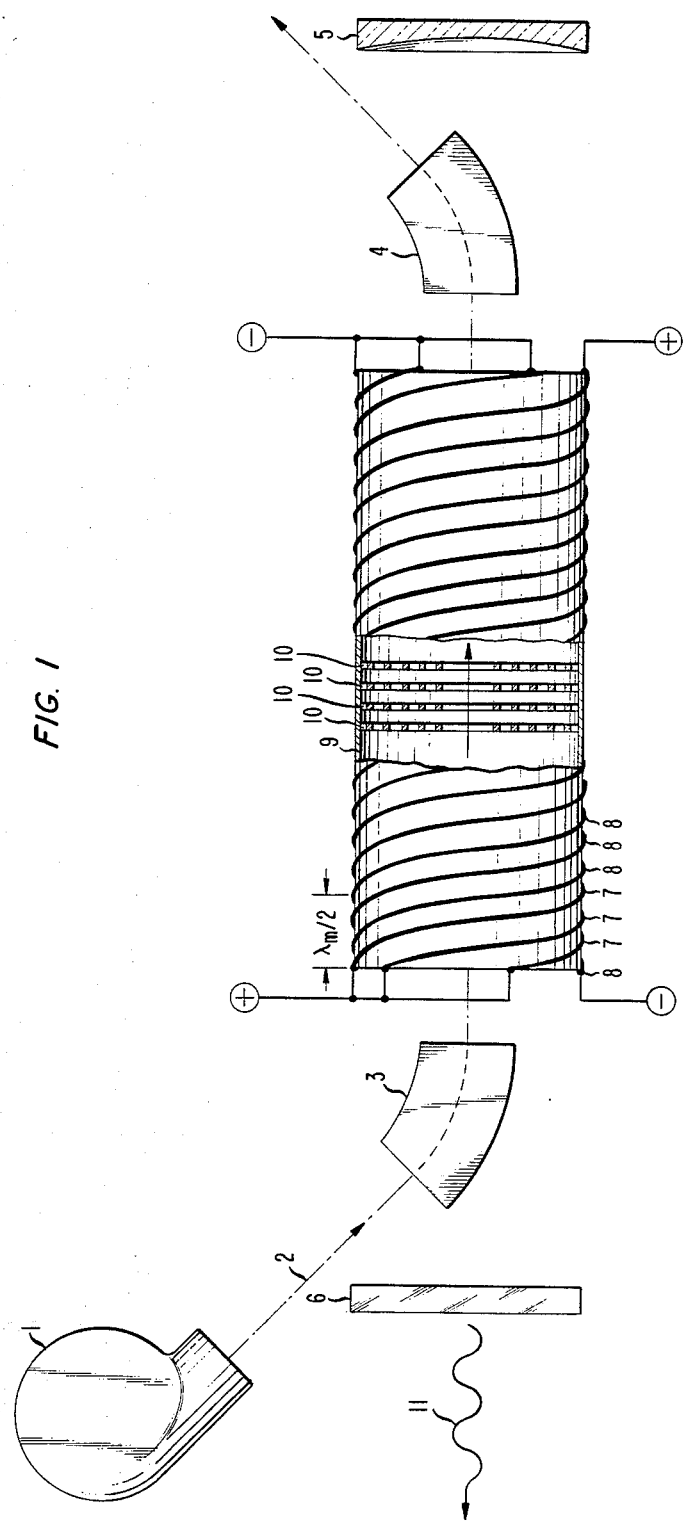
FIG. 1 is a schematic representation of a free-electron laser comprising a delay element in accordance with the invention.

Within the scope of the invention is a laser device as schematically depicted in FIG. 1. Such device comprises an electron source 1 for producing an electron beam 2, an injection magnet 3 for aligning beam 2 with the optical axis of the laser cavity between totally reflecting mirror 5 and partially transparent mirror 6, and an extraction magnet 4 for removing electrons of beam 2 from the cavity. A source of a helical magnetic field comprising electrical conductors 7 and 8 on support 9 serves to impart transversal acceleration to the electrons of beam 2. Wire meshes 10 inside support 9 form a resonant filter which serves as a delay element. Device operation results in coherent radiation 11 being emitted through semitransparent mirror 6.

Figure 2:
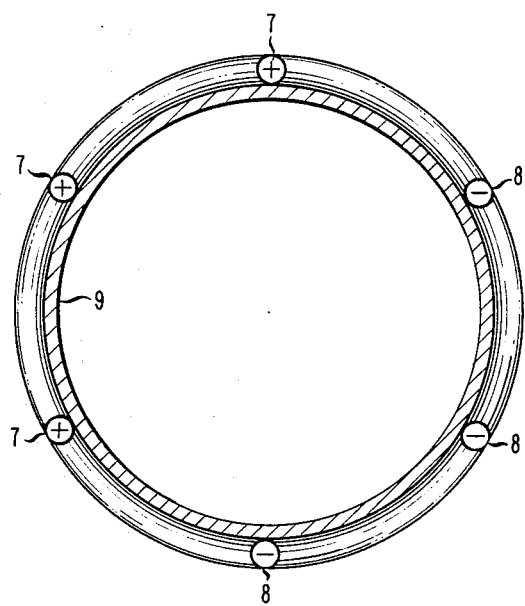
FIG. 2 is a schematic view of electrical connections to a helical magnet arrangement shown in FIG. 1.

FIG. 2 shows connections to three electrical conductors 7 and three electrical conductors 8 on support 9. During device operation, current in conductors 7 is in a forward direction relative to the electron beam, and current in conductors 8 is in a direction opposite to the electron beam, producing a transversal, spiralling magnetic field.

Figure 3:
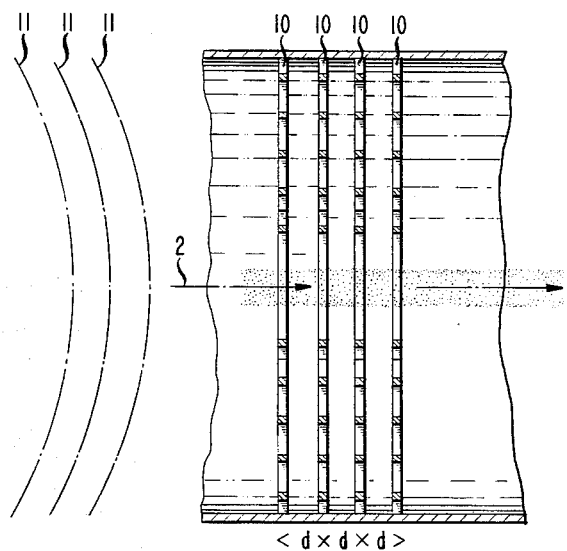
FIG. 3 is a schematic cross-sectional representation of a preferred embodiment of a delay element in accordance with the invention.
Figure 4:
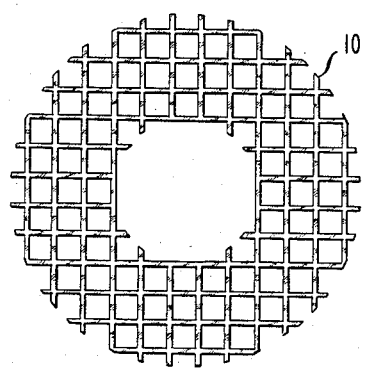
FIG. 4 schematically represents a preferred delay element as viewed in the direction of propagation of radiation.
Figure 5:
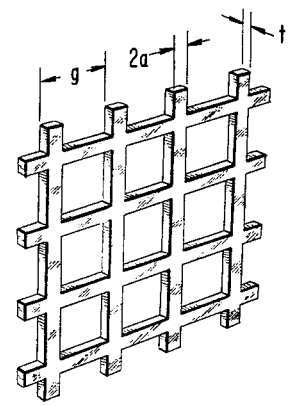
FIG. 5 represents in schematic perspective a portion of the delay element of FIG. 4.

FIG. 3 shows four wire meshes 10 having central openings which permit unhindered passage of electrons; and wire mesh may have the appearance of a washer as shown in FIG. 4. FIG. 5 shows grid dimensions of the wire mesh of FIG. 4, namely a thickness t, a stripe width 2a, and a mesh periodicity g. The distance d between wire meshes is preferably equal to the length of a half-wave of electromagnetic radiation or to an odd integral multiple of such length. The use of at least two and preferably at least four wire meshes is desirable in the interest of producing a phase shift of $2\pi$ or of an integral multiple of $2\pi$.

While wire meshes are preferably as depicted in FIG. 4 and 5, grating-type meshes consisting essentially of parallel strips are not precluded. Applicable also are so-called capacitive grids as considered by R. Ulrich, (1967; cited above); however, the presence of a substrate in the path of electromagnetic radiation may cause undue attenuation.

While a helical magnet arrangement of a type shown in FIG. 1 is considered particularly convenient for accelerating electrons so as to establish positive net emission of electromagnetic radiation, other sources of a transversal magnetic field may be suitable. Moreover, it is possible to use longitudinally varying magnetic fields, and to each type of magnetic field there is an electric field counterpart. However, electric fields are considered to be less practical for obtaining sufficient field strengths.

The electron source 1 shown in FIG. 1 may take the form, e.g., of a cyclotron, a Van de Graaff accelerator, a linear accelerator, or a microtron. The latter type of accelerator is described by S. P. Kapitza et al., *The Microtron*, Harwood Academic Publishers, 1978, and this device is considered to be particularly suitable as a source of free electrons (see E. D. Shaw et al., cited above). In particular, by energy-tuning a microtron accelerator from 10 to 20 MeV, a free-electron laser can be tuned to emit electromagnetic radiation having a wavelength in the range of approximately 100 to 400 micrometers.

Figure 6:
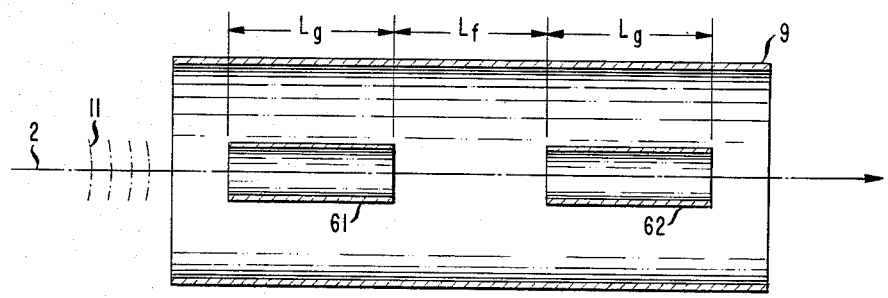
FIG. 6 represents an alternate embodiment of the invention in which the delay element takes the form of a pair of waveguides.

In an alternate embodiment of the invention as schematically shown in FIG. 6, delay of electromagnetic radiation is caused by waveguides 61 and 62 which are inside support 9 of a source of a helical magnetic field and which are traversed by electron beam 2 and electromagnetic radiation 11. Electron beam 2 remains essentially unaffected by waveguides 61 and 62, but electromagnetic radiation 11 is retarded inside the waveguides.

The group velocity $V_g$ of an electromagnetic mode propagating in a waveguide depends on the diameter of the waveguide relative to wavelength, and the amount of retardation of the mode relative to an electron pulse depends on this velocity $v_g$, the velocity $v_e$ of electrons, and the length $L_g$ of the waveguide. Specifically, such retardation may be represented by the formula $l_g=(v_e-v_g)L_g/v_g$; accordingly, by appropriate choice of the length $L_g$ of the waveguide, a desired amount $l_g$ of retardation can be obtained for electrons to catch up with electromagnetic radiation. Beyond the waveguide electromagnetic radiation again overtakes electrons, and renewed amplification of electromagnetic radiation is possible until electromagnetic radiation has outdistanced an electron pulse, e.g., over a distance $l_f=(c-v_e)L_f/c$, where c denotes the velocity of electromagnetic radiation in free space. Accordingly, as indicated in FIG. 6, a second waveguide may desirably be placed at a distance $L_f$ from the first to yet again retard electromagnetic radiation, care being taken in such placement to minimize reflections at the entrance to the waveguide.

Waveguides may be made, e.g., of metallic or dielectric materials, and they may be arranged inside a contiguous field source as shown in FIG. 6. Alternatively, waveguides may be integral to separate magnetic field sources or they may be placed so as to alternate with such field sources. Moreover, a combination of curved waveguides and of electron beam deflecting magnets is contemplated which would permit an essentially circular laser arrangement without mirrors.

EXAMPLE 1

A free-electron laser for emitting electromagnetic radiation having a wavelength of approximately 400 micrometers includes a microtron accelerator producing a 10 MeV electron beam. A helical magnet is used having an open diameter of 12.8 centimeters, a length of 10 meters, and a period of 20 centimeters. The peak current from the microtron accelerator is approximately 5 amperes and consists of electron pulses having a length of approximately 5.5 millimeters (corresponding to approximately $1.8 \times 10^{-11}$ seconds). The distance between pulses is approximately 10 centimeters (corresponding to approximately $3 \times 10^{-10}$ seconds). Electron beam emittance is approximately 1 centimeter milliradian.

To synchronize the far-infrared electromagnetic pulse with the electron beam pulse, copper meshes are placed in the path of the electromagnetic radiation. When four such meshes are used the following dimensions are appropriate (see FIGS. 3–5): a mesh periodicity of g=50 micrometers, a mesh wire width of 2a=12 micrometers, a mesh wire thickness of t=3 micrometers, and a spacing between wire meshes of approximately 200 micrometers or slightly less. A circular opening having an area of approximately 1.2 cm² permits unobstructed passage of the electron beam through the filter.

These dimensions are theoretically justified as described in the paper by E. D. Shaw and C. K. N. Patel, "Use of Intracavity Filters for Optimization of Far-Infrared Free-Electron Lasers", *Physical Review Letters*, Vol. 46, No. 5, 2 Feb. 1981, pp. 332–335; this paper is incorporated herein by reference. Accordingly, this four-element filter retards electromagnetic radiation by approximately 28 wavelengths.

EXAMPLE 2

A free-electron laser for emitting electromagnetic radiation having a wavelength of 100 micrometers includes a linear accelerator producing a 20 MeV electron beam. A helical magnet is used having an open diameter or 12.8 centimeters, a length of 10 meters, and a period of 20 centimeters. The peak current from the linear accelerator is approximately 5 amperes and consists of electron beam pulses having a pulse length of approximately 5.5 millimeters (corresponding to approximately $1.8 \times 10^{-11}$ seconds). The distance between pulses is approximately 10 centimeters (corresponding to approximately $3 \times 10^{-10}$ seconds). Electron beam emittance is approximately 0.02 centimeter milliradian.

To synchronize the electromagnetic pulse with the electron beam pulse, copper meshes are placed in the path of the electromagnetic radiation. When four such meshes are used the following dimensions are appropriate: a mesh periodicity $g = 25.4$ micrometers, a mesh wire width of $2a = 7.6$ micrometers, a mesh wire thickness of $t = 3$ micrometers, and a spacing between wire meshes of approximately 50 micrometers or slightly less. A circular opening having an area of approximately 0.032 cm$^2$ permits unobstructed passage of the electron beam through the filter. This four-element filter retards electromagnetic radiation by approximately 44 wavelengths.

EXAMPLE 3

A free-electron laser for emitting electromagnetic radiation having a wavelength of 1 millimeter includes a linear accelerator and is provided with an empty waveguide delay element. This waveguide has a length of 10 centimeters and an inner diameter of 2 millimeters; the resulting delay in the propagation of the TE$_{01}$-mode is approximately 22 wavelengths with respect to a 10 MeV electron beam.

What is claimed is:

1. Device for amplifying electromagnetic radiation, said device comprising accelerating means for accelerating electrons so as to establish positive net emission of electromagnetic radiation, said device comprising delay means for retarding the propagation of said electromagnetic radiation relative to said electrons, and said delay means comprising a resonant filter element or a waveguide.

2. Device of claim 1, said device comprising an electron source for producing a pulsed electron beam.

3. Device of claim 1, said device comprising first reflecting means for reflecting said electromagnetic radiation.

4. Device of claim 3, said device comprising second reflecting means for reflecting said electromagnetic radiation in a direction which is essentially opposite to the direction of reflection of said first reflecting means, and said second reflecting means being partially transparent to said electromagnetic radiation.

5. Device of claim 1 in which said filter element comprises at least two wire meshes, said device being for the amplification of electromagnetic radiation having a wavelength which is in the range of from 20 micrometers to 10 millimeters.

6. Device of claim 5 in which said element comprises at least four wire meshes.

7. Method of amplifying electromagnetic radiation, said method comprising accelerating electrons so as to establish positive net emission of electromagnetic radiation, said method comprising retarding the propagation of said electromagnetic radiation to permit electrons to advance relative to said electromagnetic radiation, retarding being by passing said electromagnetic radiation through a resonant filter element or through a waveguide.

* * * * *